United States Patent [19]

Sakamoto et al.

[11] 4,402,087
[45] Aug. 30, 1983

[54] BINARY CODING CIRCUIT

[75] Inventors: Fukuma Sakamoto; Isao Isshiki; Masatoshi Tanaka; Koji Satoh, all of Osaka, Japan

[73] Assignee: Sumitomo Electric Industries, Ltd., Osaka, Japan

[21] Appl. No.: 170,238

[22] Filed: Jul. 18, 1980

[30] Foreign Application Priority Data

Jul. 20, 1979 [JP] Japan .................................. 54-92311
Jul. 20, 1979 [JP] Japan ............................. 54-99314[U]
Sep. 3, 1979 [JP] Japan .................................. 54-112602

[51] Int. Cl.³ ............................................ G06K 9/36
[52] U.S. Cl. ...................................... 382/53; 382/54
[58] Field of Search ............. 340/146.3 AG, 347 AD; 382/53, 54, 59; 235/454, 456, 470, 472

[56] References Cited

U.S. PATENT DOCUMENTS

| | | | |
|---|---|---|---|
| 3,159,815 | 12/1964 | Groce | 340/146.3 AG |
| 3,225,213 | 12/1965 | Hinrichs et al. | 340/146.3 AG |
| 3,668,634 | 6/1972 | Kruklitis | 340/146.3 AG |
| 3,675,201 | 7/1972 | McKissick et al. | 340/146.3 AG |
| 3,701,099 | 10/1972 | Hall et al. | 340/146.3 AG |
| 3,800,078 | 3/1974 | Cochran et al. | 340/146.3 AG |
| 3,833,883 | 9/1974 | Haupt et al. | 340/146.3 AG |
| 3,962,681 | 6/1976 | Requa et al. | 340/146.3 AG |
| 4,129,853 | 12/1978 | Althauser et al. | 340/146.3 AG |
| 4,251,800 | 2/1981 | Sanner et al. | 382/59 |

Primary Examiner—Leo H. Boudreau
Attorney, Agent, or Firm—Sughrue, Mion, Zinn, Macpeak & Seas

[57] ABSTRACT

A binary coding circuit for converting analog electrical signals produced by a photoelectric conversion device in parallel form in either a line or column direction into binary signals representative of a background region and a character region in which fluctuations in characteristics of the photoelectric conversion elements of the conversion device and effects due to inclination of the photoelectric conversion device relative to a sheet from which characters are to be read are corrected. A plurality of comparators and level setting circuits are provided for detecting background region representing levels of the analog electrical signals in the one of the column and line directions and to set the background region representing levels of the analog electrical signals in that one of the column and line directions equal to one another. The analog electrical signals are applied to first input terminals of the comparators to the second input terminals of which are applied a binary coding threshold voltage.

15 Claims, 19 Drawing Figures

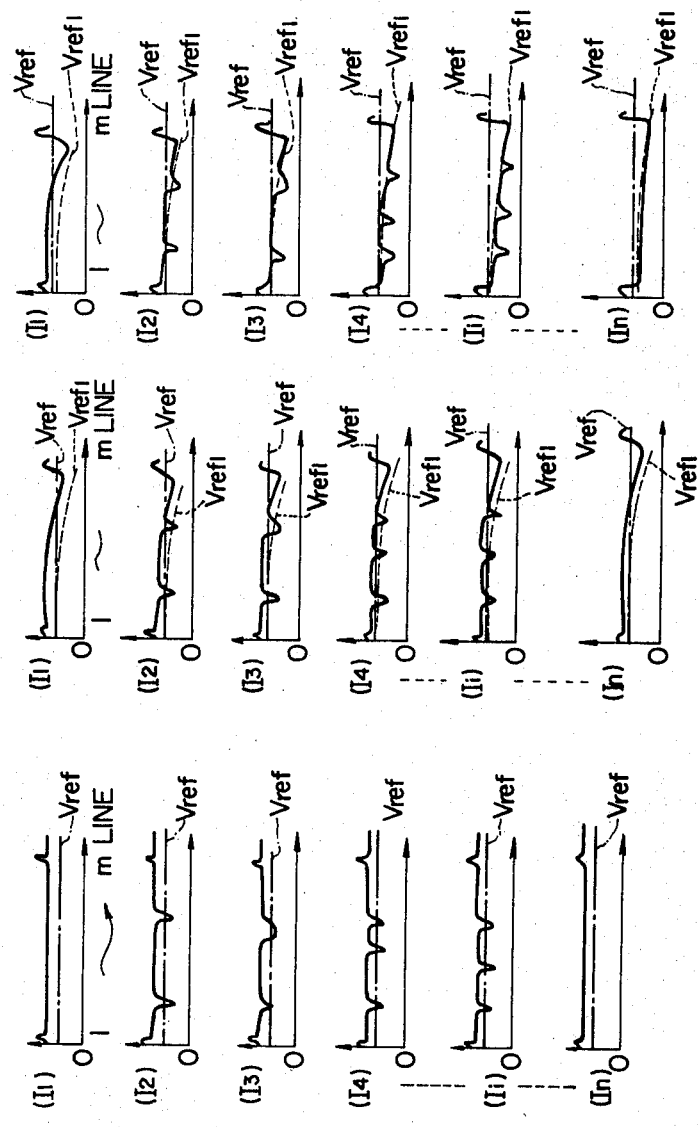

BINARY CODING CIRCUIT

BACKGROUND OF THE INVENTION

The present invention relates to a binary coding circuit for converting analog electrical signals outputted from a photoelectric conversion device into binary signals representative of a background region and a character region in which fluctuations in characteristic of photoelectric conversion elements forming the photoelectric conversion device and adverse effects due to inclination of the photoelectric conversion device are corrected.

In general, in an optical character reading device such as a symbol reading device, a sheet having characters or symbols, hereinafter referred to as "characters or the like" when applicable, is scanned with a photoelectric conversion device to provide analog electrical signals. The analog electrical signals are converted into binary signals representative of a background region and a chamber region by a binary coding circuit so that the characters or the like may be recognized using the binary signals. In this operation, the threshold value for the binary coding operation is fixed. Therefore, in order to correctly recognize characters or the like, it is essential that the levels of the analog electrical signals outputted by the photoelectric conversion device have predetermined values with respect to the background region and the character region. It is ideal that all the photoelectric conversion elements forming the photoelectric conversion device are equal in sensitivity characteristics. However, in practice, the various photoelectric conversion elements are not uniform in their sensitivity characteristics. Accordingly, for binary coding the analog electrical signals, the analog electrical signals representative of the background region may be detected as signals representative of the character region or vice versa. In addition, in cases where the refractive index of a part of the sheet is different from that of another part, the light source does not provide uniform illumination, or the sheet is tilted with respect to the light receiving surface of the photoelectric conversion device, it may be impossible to convert the output analog electrical signals of the photoelectric conversion device into binary signals which are correctly representative of the background region and the character region.

Accordingly, an object of the invention is to eliminate the above-described difficulties. More specifically, an object of the invention is to provide a binary coding circuit in which not only disadvantageous effects due to the fluctuations in characteristics of the photoelectric conversion elements but also effects due to the fluctuations in general sensitivity characteristics including the illumination distribution characteristic of the light source and the lens system are corrected for and adverse effects due to inclination of the light receiving surface of the photoelectric conversion device are also corrected for.

Additionally, in a conventional binary coding circuit, output analog electrical signals from the photoelectric conversion device are compared with a fixed reference voltage to obtain the corresponding binary signals. Since a fixed reference voltage is employed, when the levels of the analog electrical signals provided by the photoelectric conversion device are varied because of variations in intensity of the light source or due to a non-uniformity in the reflection factor of the sheet, the outputted binary signals are often erroneous. In other words, since the reference voltage cannot follow the variations in level of the analog electrical signals, a character region may be detected as the background region or vice versa.

In order to overcome the above-described drawback, a binary coding circuit has been proposed in which a device for detecting the maximum value and/or the minimum value of the analog electrical signals for single scanning line or one scanning column among the output analog electrical signals of the photoelectric conversion device is provided with which the analog electrical signals are converted into a binary signal with the maximum value and/or the minimum value thereof detected as a threshold value for the single line or column. That is, in the binary coding circuit, the threshold value is changed whenever one line or one column is scanned. Therefore, the provision of erroneous binary signals due to variations in intensity of the light source or a non-uniformity in reflection factor of the sheet having characters to be read can be prevented.

However, the conventional binary coding circuit is still disadvantageous in that, if the sheet is inclined with respect to the light receiving surface of the photoelectric conversion device in a scanning direction, erroneous binary signals may be outputted. For instance, in a hand-held scanning type optical character reading device, the light receiving surface of the photoelectric conversion device may unavoidably be inclined with respect to the sheet.

In view of the foregoing, a further object of this invention is to provide a binary coding circuit in which even when the light receiving surface of the photoelectric conversion device is inclined with respect to the sheet to be read in the direction of scanning, the analog electrical signals produced by the photoelectric conversion device are converted into binary signals correctly representative of the character region and the background region of the sheet.

SUMMARY OF THE INVENTION

These, as well as other objects of the invention, are met by a binary coding circuit for converting analog electrical signals produced by a photoelectric conversion device having photoelectric conversion elements arranged in matrix form into binary signals representative of a background region and a character region. The circuit includes a correction value setting signal generating circuit which generates a reference voltage for detecting a correction value voltage in the form of a successively varying, preferably stair-step, correcting reference voltage. A comparison circuit has a first input terminal to which the analog electrical signals are applied and a second input terminal to which the correcting reference voltage is applied. A memory device is provided which receives an output of the comparison circuit as a write signal and stores the correcting reference voltage which is available at the time that a write instruction operation is indicated by the state of the write signal. A correction value addition circuit is provided for successively adding correction values to the analog electrical signals in response to the correcting reference voltages read out from the memory device.

Yet further, the objects of the invention are met by a binary coding circuit for converting analog electrical signals produced by a photoelectric conversion device having photoelectric conversion elements arranged in matrix form into binary signals representative of a background region and a character region including a level adjusting circuit for setting the maximum background levels of the analog electrical signals outputted by the photoelectric conversion elements in the direction of line (or column) to be equal to one another. A correction value setting signal generating circuit for generating a reference voltage to detecting a correction value voltage in the form of a successively varying correcting reference voltage is provided. A comparison circuit has a first input terminal to which the analog electrical signals are applied and a second input terminal to which the correcting reference voltage is applied. A memory device receives an output of the comparison circuit as a write signal and stores the correcting reference voltage which is available at the time that a write instruction operation is indicated by the state of the write signal. A correction value addition circuit is provided for successively adding correcting values to the analog electrical signals in response to the correcting reference voltages read out of the memory device.

Yet further, these and other objects of the invention are met by a binary coding circuit for converting analog electrical signals produced by a photoelectric conversion unit having a predetermined number of photoelectric conversion elements arranged two-dimensionally into binary signals corresponding to background and character regions. The binary coding circuit includes a plurality of level adjusting circuits for setting the maximum background levels of the analog electrical signals in the direction of line (or column) equal to one another. A level detecting circuit detects the maximum background levels of output signals processed by the level adjusting circuits in the direction of column (or line). A peak detecting circuit determines the maximum character level among the output signals processed by the level adjusting circuits. A reference voltage generating circuit is provided for setting a binary coding threshold value in response to output signals of the level detecting and peak detecting circuits. A plurality of comparison circuits are provided for comparing a reference voltage produced by the reference voltage generating circuit and the output signals from the level adjusting circuit to thereby generate output binary signals.

Moreover, the objects of the invention are met by a binary coding circuit in which analog electrical signals produced in a parallel mode in one of the line direction and a column direction by a photoelectric conversion device having photoelectric conversion elements arranged two-dimensionally are converted into binary signals representative of a character region and a background region. The binary coding circuit includes a plurality of comparators, a plurality of level setting circuits for detecting background region representing levels of the analog signals in the one of the column and line directions and sets the background region representing levels equal to one another. The analog electrical signals are applied to first input terminals of the comparators. Means is provided for applying a binary coding threshold voltage to second input terminals of the comparators.

BRIEF DESCRIPTION OF THE DRAWINGS

FIG. 2 is a diagram showing waveforms of the analog electrical signals obtained when the light receiving surface of the photoelectric conversion device is completely parallel to the sheet;

FIG. 3 is a diagram showing the waveforms of the analog electrical signals obtained when the light receiving surface is inclined in the column direction;

FIG. 4 is a diagram showing the waveforms of the analog electrical signals obtained when the light receiving surface is inclined in both of the column direction and the line direction;

DESCRIPTION OF THE PREFERRED EMBODIMENTS

A first preferred embodiment of the invention will be described with reference to FIGS. 1-9 of the accompanying drawings.

Figure 1A:
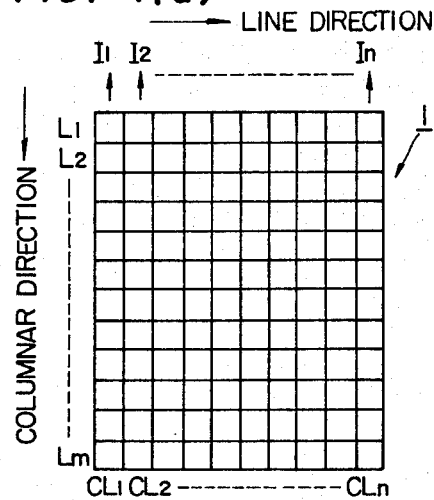
FIG. 1(a) is an explanatory diagram showing an arrangement of photoelectric conversion elements in a photoelectric conversion device and the directions in which analog electrical signals are read.
Figure 1B:
FIGS. 1(b) and 1(c) are explanatory diagrams illustrating the angles of inclination of the light receiving surface of the photoelectric conversion device in the direction of the columns and in the direction of the lines, respectively.
Figure 1C:
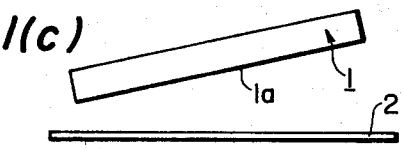

A photoelectric conversion device 1, as shown in FIG. 1(a) includes photoelectric conversion elements $1_{11}$ through $1_{mn}$ which are arranged in the form of a matrix of m lines and n columns which output analog electrical signals $I_1$ through $I_n$ in a parallel mode in the columnar direction. For instance, for the analog electrical signal $I_1$, the output voltages (the potential of the white side being higher than that of the black side) of the photoelectric conversion elements $1_{11}$ through $1_{m1}$ in the lines $L_1$ through $L_m$ of the column $CL_1$ are outputted successively whenever a predetermined period of time passes marked by a clock pulse. The analog electrical signal thus outputted is applied to a binary coding circuit constructed according to the invention. FIG. 1(b) shows the positional relationship between the sheet 2 and the light receiving surface which form an angle $\theta_1$ in the direction of the columns with respect to the sheet 2. FIG. 1(c) shows the positional relationship between the sheet 2 and the light receiving surface which form an angle $\theta_2$ in the direction of the lines with respect to the sheet 2.

The photoelectric conversion device 1 which provides analog electrical signals to a binary coding circuit according to this embodiment of the invention is the same as that shown in FIG. 1(a).

The waveforms of the output analog electrical signals $I_1$ through $I_n$ shown in FIG. 2 are produced under the ideal condition that the light source illuminates a sheet 2 uniformly and the sheet 2 is arranged parallel to the light receiving surface of the photoelectric conversion device 1. Therefore, in this case no problem arises even if a reference voltage $V_{ref}$ is maintained unchanged.

However, the light receiving surface of the photoelectric conversion unit 1 may be inclined with respect to the sheet 2 in one of two different ways. In one of the two ways, the photoelectric conversion unit 1 is inclined in the column direction as shown in FIG. 1(b) in such a manner that the upper end of the photoelectric conversion device 1 is closer to the sheet 2. In this case, the waveforms of the analog electrical signals $I_k$ through $I_n$ are as illustrated in FIG. 3. As is apparent from FIG. 3, the levels of the analog electrical signals $I_1$ through $I_n$ from the photoelectric conversion elements positioned in the vicinity of the line $L_m$ (inclusive) are lowered. Therefore, if the aforementioned fixed reference voltage $V_{ref}$ is employed, the analog signals for the background region (white level) may erroneously be binary coded as those for a character region (black level).

This difficulty can be eliminated by employing the following technique. The most white levels of the analog electrical signals are detected at the respective signal processing time instants and the reference voltages $V_{ref}$ are continuously varied based on the most white levels thus detected. However, it should be noted that this technique can only be successfully employed if the light receiving surface is parallel to the sheet 2 in the line direction.

In practice, the light receiving surface often is inclined with respect to the sheet 2 in the line direction as shown in FIG. 1(c) in which the left end of the photoelectric conversion unit 1 is closer to the sheet 2. In this case, the waveforms of the analog electrical signals $I_1$ through $I_n$ are as illustrated in FIG. 4, respectively. As is clear from FIG. 4, the levels of the analog electrical signals $I_1$ through $I_n$ are such that the levels of the analog electrical signals from the photoelectric conversion element on the right side are lower than those of the analog electrical signals from the photoelectric conversion elements on the left side.

Therefore, as before, even if the most white levels of the analog electrical signals $I_1$ through $I_n$ in the line direction are detected to correct the levels of the respective reference voltage $V_{ref}$ as in the above-described case, the analog electrical signals from the photoelectric conversion elements located in the vicinity of the column $CL_n$ (inclusive) which represent the background region may be erroneously binary coded as those representing a character region. In other words, the levels of the analog electrical signals $I_1$ through $I_n$ at the respective signal processing time instants are such that the level of the analog electrical signal $I_1$ is higher than that of the analog electrical signal $I_n$ and the most white level among the white levels of the analog electrical signals defined by the lines $L_1$ through $L_m$ is the white level of the analog electrical signals $I_1$. Accordingly, the levels of the analog electrical signals from the photoelectric conversion elements located in the vicinity of the column $CL_n$ (inclusive) may be erroneously determined as black levels even if they represent the background region. This drawback may be eliminated by shifting the level of the reference voltage $V_{ref1}$. However, this will cause another drawback in that printed characters of low density may be determined as white.

Figure 5:
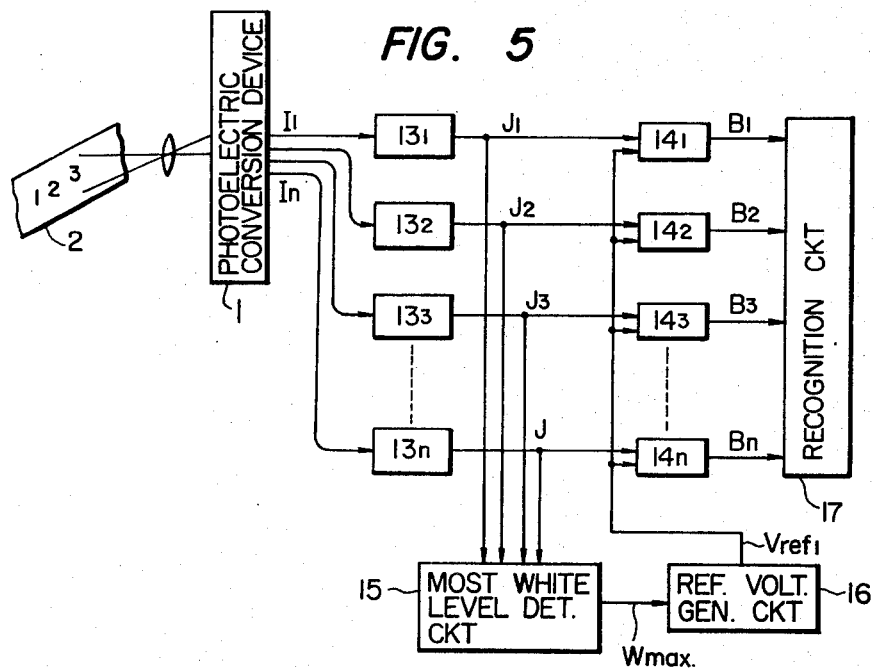
FIG. 5 is a block diagram showing a binary coding circuit according to a first embodiment of the invention and a part of an optical character reading device.

The binary coding device of the first embodiment of the invention, as shown in FIG. 5, includes column level adjusting circuits $13_1$ through $13_n$ the number n of which is equal to the number of columns in order to correct the above-described errors attributed to the inclination of the light receiving surface with respect to the sheet in the line direction. The analog electrical signals $I_1$ through $I_n$ outputted by the photoelectrical conversion unit 1 are applied to the column level adjusting circuits $13_1$ through $13_n$ where errors due to the inclination of the light receiving surface with respect to the sheet in the line direction are corrected. That is, the analog electrical signals $I_1$ through $I_n$ are outputted as analog electrical signals $J_1$ through $J_n$ by the level adjusting circuits $13_1$ through $13_n$, respectively. The signals $J_1$ through $J_n$ are applied to comparators $14_1$ through $14_n$ respectively and to a most white level detecting circuits 15 for setting the level of reference voltage $V_{ref1}$ to correct for errors due to the inclination in the column direction. In the most white level detecting circuits 15, the most white level $W_{max}$ among the white levels of the analog electrical signals $J_1$ through $J_n$ in the line direction is detected. The value of the reference voltage $V_{ref}$ outputted by a reference voltage generating circuit 16 is set with the aid of the most white level $W_{max}$. The reference voltage $V_{ref}$ is compared with the analog electrical signals $J_1$ through $J_n$ respectively in the comparison circuits $14_1$ through $14_n$ as a result of which binary signals $B_1$ through $B_n$ corresponding to the analog electrical signals $J_1$ through $J_n$ are applied from the comparators $14_1$ through $14_n$ to a recognition circuit 17. The binary signals $B_1$ through $B_n$ thus provided are those which are obtained by correcting the errors due to the inclination of the photoelectric conversion device in the line and column directions and are accurately representative of the background region and the character region.

Since the column adjusting circuits $13_1$ through $13_n$ are of identical construction, only the arrangement of the circuit $13_1$ will be described with reference to FIG. 6.

Figure 6:
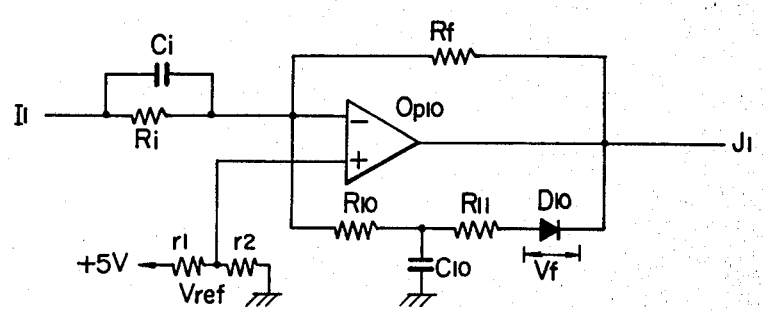
FIG. 6 is a circuit diagram showing a column level adjusting circuit employed in the binary coding circuit of the first embodiment of the invention.

The circuit $13_1$, as shown in FIG. 6, includes a differential amplifier $OP_{10}$ an input resistor $R_i$, a feedback resistor $R_f$, resistors $R_{10}$, $R_{11}$, a capacitor $C_{10}$ and a diode $D_{10}$ for adjusting the level of the background region, adjustment level setting resistors $r_1$ and $r_2$, and an accelerating capacitor $C_i$.

Figure 7A:
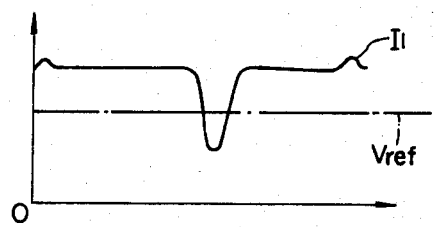
FIG. 7(a) is a diagram showing the waveform of an analog electrical input signal to one of the column level adjusting circuits.
Figure 7B:
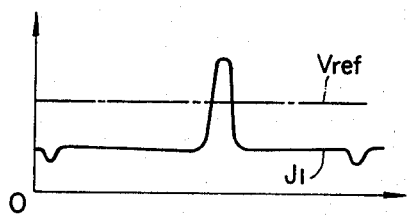
FIG. 7(b) is a diagram showing the waveform of an analog electrical output signal of the column level adjusting circuit.

Upon application of the analog electrical signal $I_1$ to the column level adjusting circuit $13_1$, the white level of the output analog electrical signal $J_1$ of the differential amplifier $OP_{10}$ is stored in the capacitor $C_{10}$ and the white level thus stored is added to the level of the analog electrical signal $I_1$. As a result, the most white level of the analog electrical signal $J_1$ is shifted near to a reference voltage determined by the resistors $r_1$ and $r_2$. A drop in the analog electrical signal $I_1$ due to the presence of a character is inverted and amplified by the operational amplifier $OP_{10}$ in circuit with the feedback resistor Rf and the input resistor Ri and is then added to the most white level which has been shifted near to the reference voltage $V_{ref}$. This will become more apparent from FIG. 7(a) and FIG. 7(b). That is, the analog electrical signal $I_1$ of which the waveform is as shown in FIG. 7(a) becomes the analog electrical signal $J_1$ whose waveform is as shown in FIG. 7(b) in which the level of the background region is close to the level of the reference voltage $V_{ref}$.

Adjustment of the level of the background region by the column level adjusting circuit, relating to the formation of the analog electrical signal $J_1$ outputted when the DC signal is inputted, that is, when the analog electrical signal $I_1$ represents the background region, reduces the difference $\Delta I_{cmax}$ between the column background region levels to:

$$\frac{R_{10} + R_{11}}{Ri \cdot (R_{10} + R_{11} + Rf)} \cdot \Delta I_{cmax}.$$

In this embodiment, with $R_{10} = R_{11} = Ri/10$, and $Rf = 2Ri$, and the difference mentioned above can be reduced to about 1/100.

The fluctuations of the levels of the background region represented by the analog electrical signals $I_2$ through $I_n$ as shown in FIG. 4 due to the inclination of the light receiving surface in the line direction as shown in FIG. 1(b) are corrected by the column level adjusting circuits $13_2$ through $13_n$ which are the same in construction to the above-described column level adjusting circuit $13_1$. Thus, in combination with the most white level detecting function in the line direction, the analog electrical signals can be correctly converted into binary signals no matter in what direction, vertically or horizontally, the light receiving surface is inclined.

Figure 8:
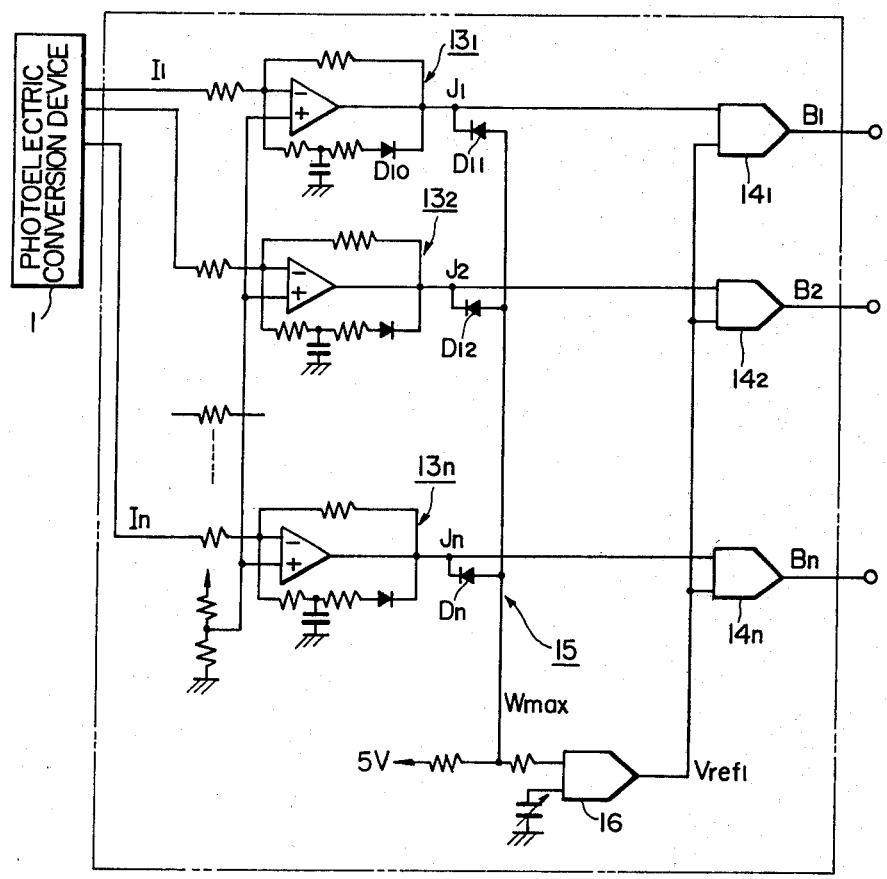
FIG. 8 is a circuit diagram showing the overall arrangement of the binary coding circuit of the first embodiment of the invention.
Figure 9:
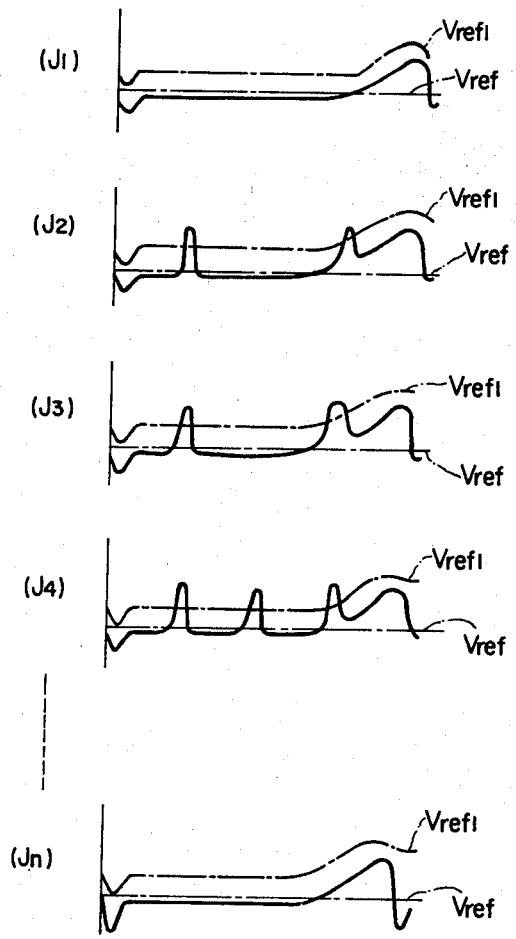
FIG. 9 is a diagram showing the waveforms of analog electrical input signals of the comparators of the first embodiment of the invention.

The overall circuitry of the embodiment including the most white level detector is shown in FIG. 8. In FIG. 8, reference characters $D_{10}$ through $D_n$ designate diodes. The most white level $W_{max}$ obtained by adding the forward potential of the diodes $D_{10}$ through $D_n$ to the most white level among the white levels of the analog electrical signals $J_1$ through $J_n$ provided through the column level adjustment is detected. In response to this detection, the reference voltage generating circuit 16 generates the reference $V_{ref1}$ which is obtained by adding a predetermined potential to the most white level $W_{max}$. Thus, the analog electrical signals $I_1$ through $I_n$ shown in FIG. 4 are converted into the corresponding analog electrical signals $J_1$ through $J_n$ shown in FIG. 9, respectively, and are binary coded with the reference voltage $V_{ref1}$ as a threshold value.

In the above-described embodiment, the reference voltage $V_{ref1}$ is determined from the most white level $W_{max}$. However, the technical concept of the invention can be applied to a method in which the reference voltage is determined from both of the most white level and the most black level. In the latter case, the binary coding operation is effected with the densities of characters taken into account.

Furthermore in the above-described first embodiment, the outputs of the photoelectric conversion elements arranged in the line direction of the photoelectric conversion device 1 are inputted in a parallel mode and therefore the column level corrections are carried out by the column level adjusting circuits $13_1$ through $13_n$. In the case where the outputs of the photoelectric conversion elements, arranged in the column direction, of the photoelectric conversion device 1 are inputted in a parallel mode, the line level corrections can be carried out by circuits similar to the column level adjusting circuits. In the latter case, the most white level in the column direction is detected and the threshold value is shifted according to the detection value whereby similarly as in the above-described embodiment the errors caused by the inclination of the photoelectric conversion element 1 in the vertical and horizontal directions are corrected.

As is clear from the above description, the binary coding circuit according to the first embodiment of the invention includes the column level adjusting circuits or line level adjusting circuits for correcting the variations of the levels in the column or line direction of the continuously provided analog electrical signals attributed to the inclination of the photoelectric conversion element. Therefore, with the binary coding circuit, the variations due to inclination are effectively cancelled whereby binary signals corresponding exactly to the background region and the character region are provided.

A second preferred embodiment of the invention will be described with reference to FIGS. 10-12 of the accompanying drawings. The photoelectric conversion device used in this embodiment is the same as that shown in FIG. 1.

Figure 10:
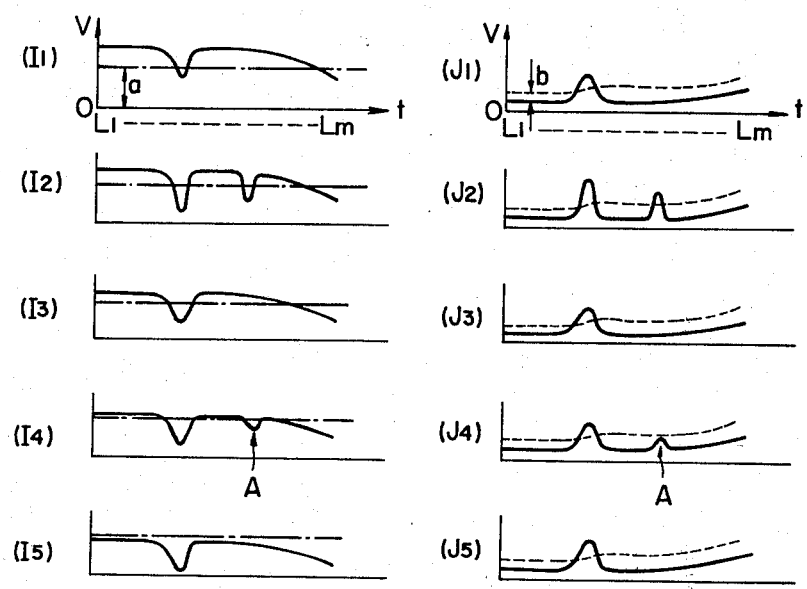
FIG. 10 shows waveform diagrams indicating analog electrical signals outputted by the photoelectric conversion device and conventional reference voltages.

FIG. 10 shows examples of the waveforms of the analog electric signals $I_1$ through $I_5$ which are produced when a sheet 2 forms an angle $\theta_2$ with the light receiving surface of the photoelectric conversion device 1 as shown in FIG. 1(c) and the light source produces non-uniform illumination so that the illumination of the lower lines to relatively dark. If, in this case, binary coding is carried out with a fixed reference voltage a indicated by the dot-chain line, the background of a part of the sheet where illumination is inadequate and the background (usually white) of a part farther from the light receiving surface of the photoelectric conversion device maybe detected as a character region and a noise signal such as a part A in the $I_4$ waveform of FIG. 14 may erroneously be detected as the character region. FIG. 1(b) shows the positional relationship between the sheet 2 and the light receiving surface which form an angle $\theta_1$ in the direction of the columns with respect to the sheet 2.

This embodiment will be described with the assumption that the background region is white and the character region is black. FIG. 11 is a block diagram showing a circuit of the second embodiment of the invention. The circuit, as shown in FIG. 11, includes: level adjusting circuits $LC_1$ through $LC_n$ for setting the most white levels in the direction of the columns of the analog electrical signals $I_1$ through $I_n$ equal to one another, a white level detecting circuit 23 for detecting the most white level of the white levels in each line from the output signals $J_1$ through $J_n$ of the level adjusting circuits $LC_1$ through $LC_n$, a black level detecting circuit 24 for detecting the most black level from the output signals $J_1$ through $J_n$ of the level adjusting circuits $CL_1$ through $CL_n$, a reference voltage generating circuit 25 for providing a reference voltage $V_{ref}$ utilizing the output signal $W_p$ of the white level detecting circuit 23 and the output signal $B_p$ of the black peak detecting circuit 24, and comparison circuits $CP_1$ through $CP_n$ for binary coding the output signals $J_1$ through $J_n$ of the columns whose most white levels have been adjusted to be equal to one another using the reference voltage $V_{ref}$. The binary coded output signals $B_1$ through $B_n$ of the comparison circuits $CP_1$ through $CP_n$ are applied to a recognition circuit (not shown) whereby the characters are recognized.

Figure 11:
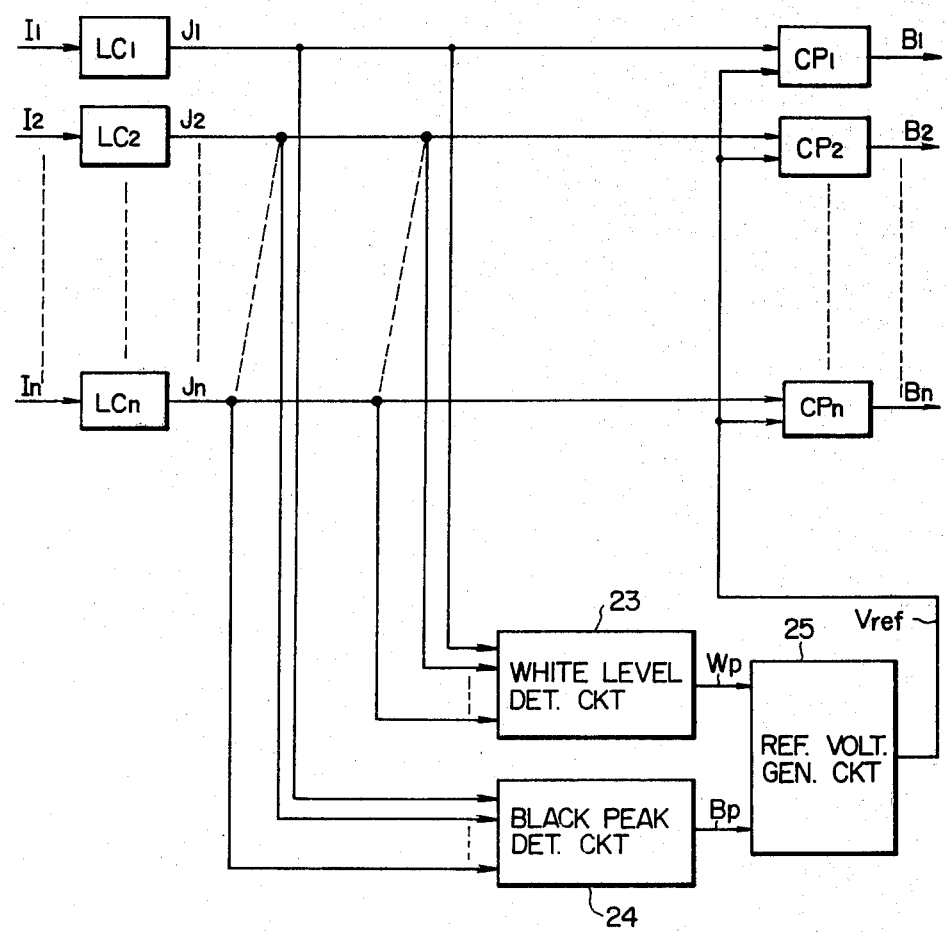
FIG. 11 is a block diagram of a second preferred embodiment of the invention.
Figure 12:
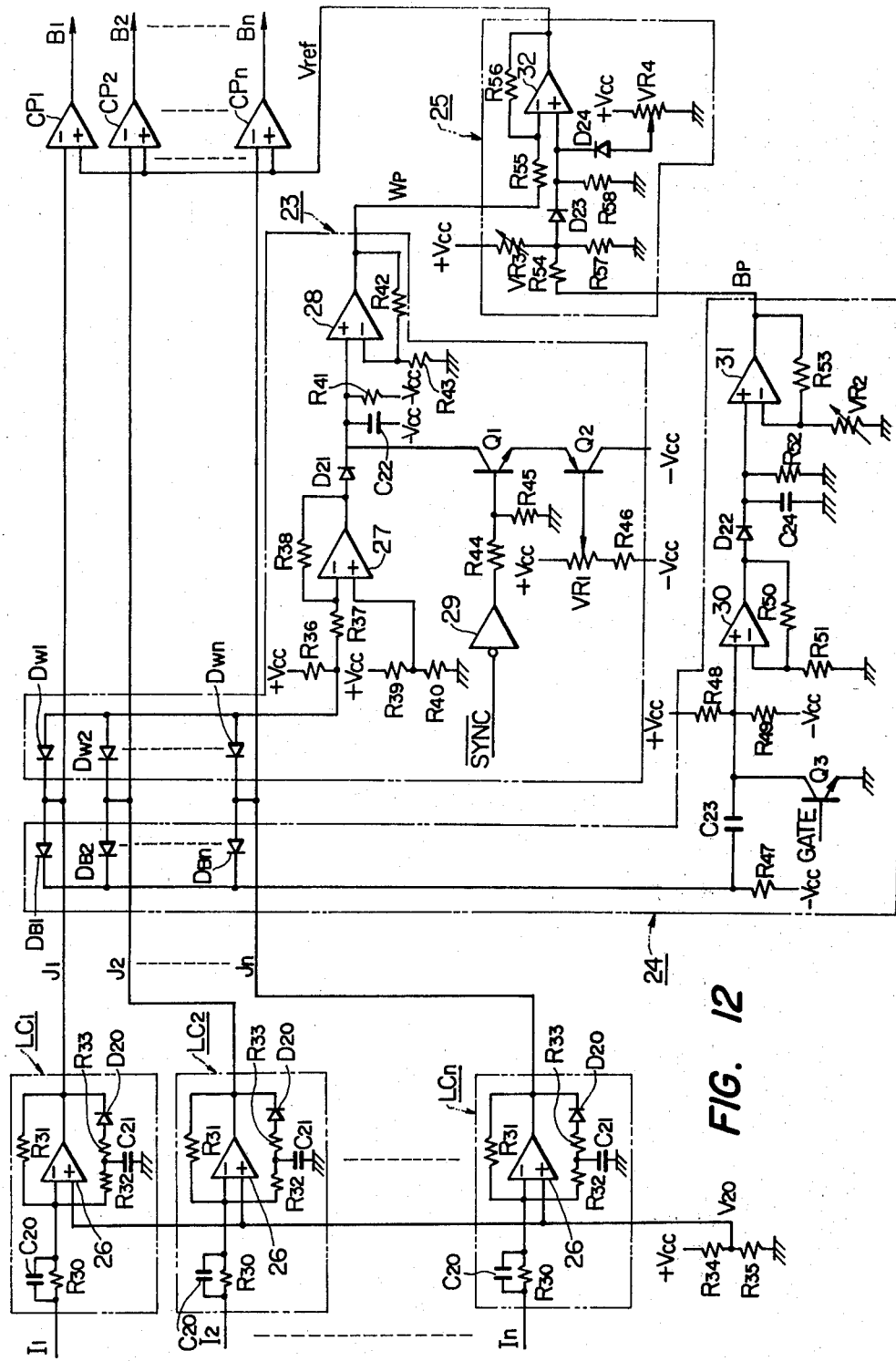
FIG. 12 is a circuit diagram showing the circuit in FIG. 8 in more detail.

The circuit in FIG. 11 is shown in more detail in FIG. 12. Referring first though back to FIG. 10, the waveforms $J_1$ through $J_5$ show the output signals $J_1$ through $J_5$ of the level adjusting circuits $LC_1$ through $LC_5$ in the case when the most white levels of the respective corresponding analog electrical signals $I_1$ through $I_5$ are adjusted to be equal to one another. In the case of the second embodiment, the output signals $J_1$ through $J_5$ are shown inverted. As is apparent from the waveform $J_1$ through $J_5$ of FIG. 10, the most white levels on the low voltage side, inverted, of the output signals $J_1$ through $J_n$ of the column are equal to one another.

The level adjusting circuits $LC_1$ through $LC_n$ are specifically illustrated in FIG. 12. Each of the level adjusting circuits includes a differential amplifier 26, an input resistor $R_{30}$, a feedback resistor $R_{31}$, a level adjusting diode $D_{20}$, a capacitor $C_{21}$, resistors $R_{32}$ and $R_{35}$, adjustment level setting resistors $R_{34}$ and $R_{35}$, and an acceleration capacitor $C_{20}$.

By way of example, the operation of the level adjusting circuit $LC_1$ will be described. The white level of the output signal $J_1$ is applied through the diode 20 to the capacitor $C_{21}$ where it is stored. The white level thus stored is added to the analog electrical signal $I_1$ as a result of which the most white level of the output signal $J_1$ is shifted close to the set voltage $V_1$ which is defined by the resistors $R_{34}$ and $R_{35}$. The drop in the analog electrical signal $I_1$ attributed to the presence of a character is inverted and amplified by the amplifier 26 in circuit with the input resistor $R_{30}$ and the feedback resistor $R_{31}$ and is then added to the most white level which has been shifted close to the set voltage $V_{20}$.

The white level detecting circuit 23 detects the most white level among the white levels in each line from the output signals $J_1$ through $J_n$ of the columns whose most white levels have been adjusted to be equal to one another as described. The circuit 23, as shown in detail in FIG. 12, includes most white level detecting diodes $D_{w1}$ through $D_{wn}$, a common resistor $R_{36}$, a differential amplifier 27, an input resistor $R_{37}$, a feedback resistor $R_{38}$, level setting resistors $R_{39}$ and $R_{40}$, a charging diode $D_{21}$, charging and discharging capacitor $C_{22}$ and resistor $R_{41}$, a differential amplifier 28, amplification factor setting resistors $R_{42}$ and $R_{43}$, a discharging transistor $Q_1$, an inverter 29, a bias resistor $R_{45}$, a discharge value adjusting transistor $Q_2$, a variable resistor $VR_1$, and a resistor $R_{46}$.

In operation, the minimum voltage (most white level) among the voltages of the output signals $J_1$ through $J_n$ of the level adjusting circuits $LC_1$ through $LC_n$ is applied through one of the diodes $D_{w1}$ through $D_{wn}$ to the differential amplifier 27 where it is inverted and amplified. This amplified voltage charges the capacitor $C_{22}$ through the diode $D_{21}$ and is amplified by the differential amplifier 28 which provides an output $W_p$ representative of the most white level in each line. In this operation, whenever the photoelectric conversion device operates in the column direction scanning mode, a synchronization level which is higher toward the white than the white level of the background is added to the analog electrical signals $I_1$ through $I_n$. In order to avoid an adverse effect due to the detection of this level, the capacitor $C_{22}$ is discharged through the transistors $Q_1$ and $Q_2$ with the aid of a synchronizing pulse $\overline{SYNC}$ provided by the photoelectric conversion device. The voltage, after the capacitor $C_{22}$ has been discharged, is adjusted and set by the variable resistor $VR_1$. The time constant of the capacitor $C_{22}$ and the resistor $R_{41}$ is determined taking into account the white level variation percentage in the column direction of the output signals $J_1$ through $J_n$ when the angle of inclination $\theta_2$ between the sheet 2 and the light receiving surface of the photoelectric conversion device is a maximum. However, it is preferable that the time constant be set so that the white level variation percentage is less severe than that in the character regions.

The black peak detecting circuit 24 for detecting the most black level from the output signals $J_1$ through $J_n$ of the columns is specifically shown in FIG. 12.

The black level detecting circuit 24, as shown in FIG. 12, includes most black level detecting diodes $D_{B1}$ through $D_{Bn}$, a common resistor $R_{47}$, a coupling capacitor $C_{23}$, a detection controlling transistor $Q_3$, bias resistors $R_{48}$ and $R_{49}$, a differential amplifier 30, amplification factor setting resistors $R_{50}$ and $R_{51}$, a charging diode $D_{22}$, charging and discharging capacitor $C_{24}$ and resistor $R_{52}$, a differential amplifier 31, an amplification factor adjusting variable resistor $VR_2$, and a resistor $R_{53}$.

The maximum voltage (most black level) among the voltages of the output signals $J_1$ through $J_n$ of the level adjusting circuits $LC_1$ through $LC_n$ is extracted by means of the diodes $D_{B1}$ through $D_{Bn}$ and its variation component is added to the bias voltage through the capacitor $C_{23}$ and the resultant voltage is amplified by the differential amplifier 30. The voltage thus amplified charges the capacitor $C_{24}$ through the diode $D_{22}$ and is then amplified by the differential amplifier 31 which provides an output $B_p$ representative of the most black level.

In this connection, the time constant of the capacitor $C_{24}$ and the resistor $R_{52}$ is set so as to maintain the charge voltage for a period of time required to scan a single frame. The variable amplitude of the output $B_p$ can be adjusted and set by operating the variable resistor $VR_2$.

The above-described outputs $W_p$ and $B_p$ are applied to the reference voltage generating circuit 25 which may be configured, for instance, as illustrated in FIG. 12.

The reference voltage generating circuit 25, as shown in FIG. 12, includes a differential amplifier 32, input resistors $R_{54}$ and $R_{55}$, a feedback resistor $R_{56}$, a variable resistor $VR_3$ and a resistor $R_{57}$ for setting the center value of the reference voltage, diodes $D_{23}$ and $D_{24}$, a resistor $D_{58}$, and a minimum black level setting variable resistor $VR_4$.

In operation, the output $W_p$ of the white level detecting circuit 23 is inverted and amplified by the differential amplifier 32. The output $B_p$ of the black peak detecting circuit 24 is added to the center voltage which is adjusted and set by the variable resistor $VR_3$ and the resistor $R_{57}$ and the resultant voltage is applied through the diode $D_{23}$ to the differential amplifier 32 where it is amplified. Thus, the sum of the amplified voltage and the inverted and amplified voltage is outputted as a reference voltage $V_{ref}$. A voltage which is applied through the variable resistor $VR_4$ and the diode $D_{24}$ to the differential amplifier and is amplified by the latter is added to the reference voltage $V_{ref}$. This establishes a minimum reference voltage for the case where the black level is partially low.

The time constants in the white level detecting circuit 23 and in the black peak detecting circuit 24 are so set that the maximum variation percentage of the reference voltage $V_{ref}$ which is outputted by the reference voltage generating circuit 25 with the aid of the most black level $B_p$ and the most white level $W_p$ in each line is less than the white level variation percentage provided when the angle of inclination $\theta_1$ with respect to the column direction is a maximum. Thus, as indicated by the broken lines in the wave form diagrams $J_1$ through $J_5$ of FIG. 10. The reference voltage $V_{ref}$ is varied along with the variations in the column direction while maintaining a potential difference b defined by taking the light and shade of characters into account as being substantially constant with respect to the white levels of the output signals $J_1$ through $J_2$. Accordingly, when the output signals $J_1$ through $J_n$ and the common reference voltage $V_{ref}$ are applied to the comparison circuits (or differential amplifiers) $CP_1$ through $CP_n$, then the black level of characters is binary coded as black because it changes by a large magnitude and changes quickly. On the other hand, the black level due to the noise A which has only a relatively small variation is binary coded as white. The most white levels which change toward the black level are binary coded as white because the reference voltage $V_{ref}$ is changed similarly.

As described above, in the case where the light receiving surface 1a is tilted in the line direction shown in FIG. 1(c), the most white levels of the columns are set to be equal to one another by the level adjusting circuit $LC_1$ through $LC_n$ as a result of which the errors in binary coding due to inclination are eliminated. On the other hand, in the case where the light receiving surface 1a is inclined in the line direction, the detection of the most white level in each line allows the reference voltage $V_{ref}$ to follow the variations of the most white level as a result of which the errors in binary coding due to inclination are similarly eliminated. The reference voltage $V_{ref}$ is varied by the most black level also. Therefore, even in the case where the range of the photoelectric conversion device is, in its entirety, occupied by black as in the case of a character having an elongated segment in the line direction, it can be binary coded as black. Furthermore, even if a character has light and shadow portions, the line width after being binary coded is not affected by the light and shadow.

An example of component values of the circuit in FIG. 12 is as follows: $R_{30}$ and $R_{31}$ ... 20KΩ; $R_{32}$, $R_{33}$ and $R_{45}$ ... 1KΩ; $R_{34}$ ... 3.9KΩ; $R_{35}$ ... 1.5KΩ; $R_{36}$, $R_{37}$, $R_{38}$, $R_{43}$, $R_{48}$, $R_{51}$, $R_{55}$, $R_{56}$ and $R_{57}$ ... 10KΩ; $R_{39}$ ... 5.6KΩ; $R_{40}$ ... 4.7KΩ; $R_{41}$ and $R_{52}$ ... 500KΩ; $R_{42}$, $R_{50}$ and $R_{53}$ ... 2.2KΩ; $R_{44}$ ... 2KΩ; $R_{46}$ ... 13KΩ; $R_{47}$ and $R_{48}$ ... 30KΩ; $R_{54}$ ... 22KΩ; $R_{58}$ ... 100KΩ; $VR_1$ and $VR_2$ ... 100KΩ; $VR_3$ ... 20KΩ; $C_{20}$ ... 200 pF; $C_{21}$ ... 4.7 μF; $C_{22}$ ... 2200 pF; $C_{23}$ ... 1 μF; $C_{24}$ ... 0.1 μF; +Vcc ... 5 V; and −Vcc ... 12 V.

In the above-described embodiment, the background region is assumed white and the character region black. However, the background region may be black and the character region white. Furthermore, in the above-described embodiment, the most white levels of the columns are set to be equal by the level adjusting circuits $LC_1$ through $LC_n$. However, in the case where the analog electrical signals are outputted in a parallel mode in the line direction, the most white levels of the lines are adjusted to be equal. In the latter case, the white level detecting circuit 23 detects the most white level in each line. In addition, the level adjusting circuits $LC_1$ through $LC_n$ are not limited only to those in which input signals are inverted and amplified. Furthermore, the white level detecting circuit 23, the black peak detecting circuit 24, the reference voltage generating circuit 25 and the comparison circuits $CP_1$ through $CP_n$ are not limited to those in FIG. 12.

As was described above, according to the invention, even if the analog electrical signals are not uniform in level because of the inclination of the light receiving surface of the photoelectric conversion device with respect to the sheet or in the presence of the non-uniform illumination or the non-uniform reflection factors, no error is present in the binary coding operation. Furthermore, binary coding can be achieved correctly for characters which are larger than the range of the photoelectric conversion device. In addition, even if a character has both light and shadow portions, the line width after being binary coded is sufficiently wide. Owing to the above-described effects, the invention can be effectively applied to a hand scanner type optical character reading device and to an optical character reading device for reading hand-written characters or the like.

A third preferred embodiment of the invention will be described with reference to FIGS. 13-16.

Figure 13:
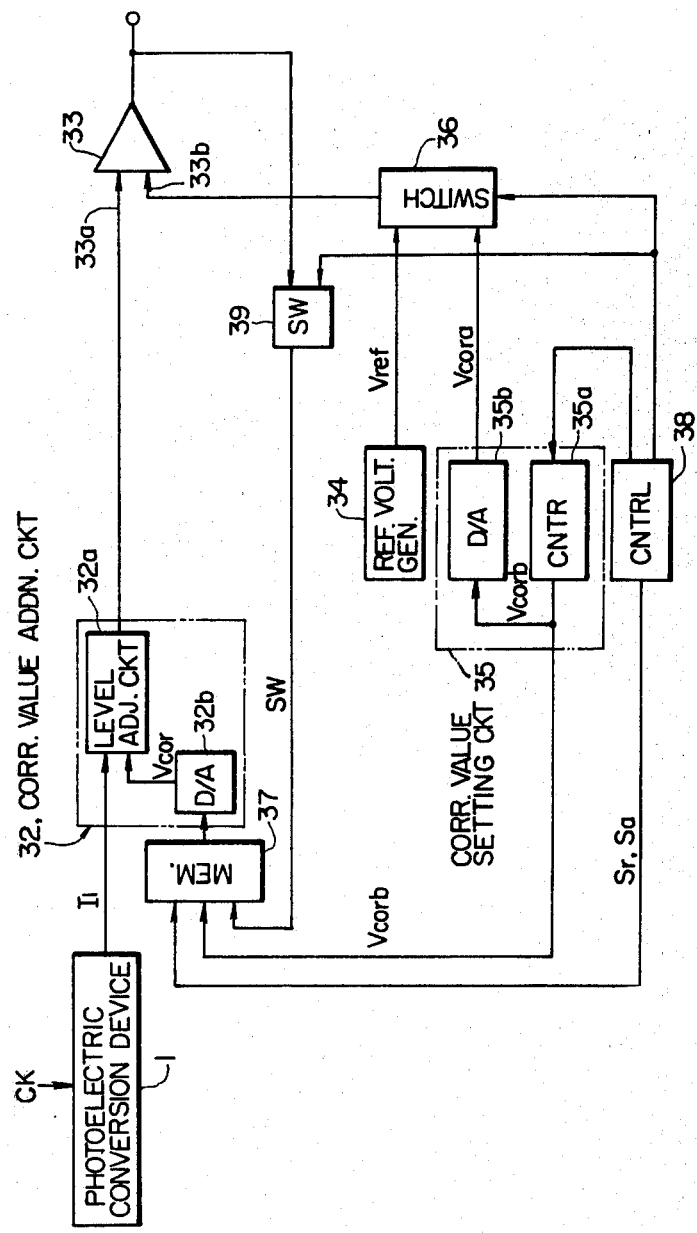
FIG. 13 is a block diagram showing a portion of a third embodiment of the invention.

FIG. 13 is a block diagram showing a binary coding circuit according to the third preferred embodiment of the invention. It should be noted that the block diagram shows only a part of the binary coding circuit, that is, FIG. 13 illustrates a portion thereof which processes the analog electrical signal $I_1$ and a portion used commonly for processing the remaining analog electrical signals $I_2$ through $I_n$.

As shown in FIG. 13, the analog electrical signal $I_1$ is applied through a level adjusting circuit 32a (described in detail later) to one input terminal 33a of a comparison circuit 33. One of a reference voltage $V_{ref}$ which is provided as a binary coding threshold value by a reference voltage generating circuit 34 and a correcting reference voltage $V_{cora}$ which is outputted by a correction value setting signal generating circuit 35 is selectively applied to the other input terminal 33b of the comparison circuit 33 by means of an analog switch 36. The reference voltage $V_{ref}$ is the binary coding threshold value which is used in reading characters or the like with an optical character reading device. The correcting reference voltage $V_{cora}$ is the threshold value which is employed to form correction values $V_{cor}$ in order to correct the fluctuations in characteristic of the photoelectric conversion elements $1_{11}$ through $1_{mn}$ and is accordingly varied successively.

The correction value setting signal generating circuit 35 in this embodiment of the invention includes a counter 35a and a D/A conversion circuit 35b. The counter 35a operates to provide a correcting reference voltage $V_{corb}$ (in digital form) which is successively varied and is binary coded whenever the corresponding analog electrical signal $I_1$ is supplied for each line. The D/A conversion circuit 35b operates to convert the correcting reference voltage $V_{corb}$ into an analog signal and to amplify the analog signal thereby to form the corresponding correcting reference voltage $V_{cora}$. The correcting reference voltage $V_{corb}$ outputted by the counter 35a is further applied to a memory device 37 composed of a random access memory (RAM). The memory device 37 receives as a write instruction signal $S_w$, the output of the comparison circuit 33 That is, the memory device 37 stores the correcting reference voltage $V_{corb}$ as controlled by the timing of the write instruction signal.

A correction value addition circuit 32 operates to add the correction value $V_{cor}$ to the analog electrical signal $I_1$ when reading characters or the like with the optical character reading device. The circuit 32 includes the above-described level adjusting circuit 32a and a D/A conversion circuit 32b. The D/A conversion circuit 32b operates to convert the correcting reference voltage $V_{corb}$, namely, the output of the memory device 37 which is converted whenever a read instruction signal $S_r$ is present, into a corresponding analog signal to form the correction value $V_{cor}$ which is applied to the level adjusting circuit 32a. In the level adjusting circuit 32a, the correction value $V_{cor}$ is added to the analog electrical signal $I_1$. The level adjusting circuit 32a functions to bring the maximum background levels of the lines with respect to the analog electrical signal $I_1$ into coincidence with one another and also performs the above-described function of addition. This is attributed to the fact that the differential amplifier of the level adjusting circuit 32a is used commonly as the differential amplifier of the correction value addition circuit. One differential amplifier can be eliminated so that the number of differential amplifiers can be reduced by one.

A control circuit 38 is provided to control the analog switch 36, the counter 35a, the memory device 37 and a switch 39. More specifically, the control circuit 38 causes the analog switch 36 to select use of the reference voltages $V_{ref}$ and $V_{cora}$. The control circuit 38 causes the counter 35a to provide the correcting reference voltage $V_{corb}$ when the analog switch 36 selects the correcting reference voltage $V_{cora}$. With respect to the memory device 37 the control circuit 38 places the switch 39 in the "on" state when the analog switch 36 selects the correcting reference voltage $V_{cora}$ thereby to cause the switch 39 to supply the write instruction signal $S_w$. In response to the supply of the write instruction signal, the control circuit 38 provides an address signal $S_a$ to specify addresses corresponding to the photoelectric conversion elements $1_{11}$ through $1_{m1}$ for a writing operation. When the analog switch 36 selects the reference voltage $V_{ref}$, the control circuit 38 outputs the read instruction signal $S_r$ and the address signal $S_a$ to specify addresses corresponding to the photoelectric conversion elements $1_{11}$ through $1_{m1}$ for a reading operation. Thus, the control circuit 38 operates in synchronization with the clock signal CK which is used to read the contents of the photoelectric conversion device 1. The control circuit 38, may, for example, be a 64-bit continuously cycling counter.

The correction value addition circuit 32, the correction value setting signal generating circuit 35, and the memory device 37 will be described in detail with reference to FIG. 14 in more detail.

The counter 35a generates the aforementioned correcting reference voltage $V_{corb}$ which is a 3-digit binary code. More specifically, the counter 35a provides eight different codes. The contents of the counter 35a is cleared (reset) whenever each line of the photoelectric conversion elements $1_{11}$ through $1_{m1}$ has been read and the correcting reference voltage $V_{corb}$ is cyclically produced. In the D/A converter circuit 35b, the code forming the correcting reference voltage $V_{corb}$ is applied to one terminal of each of the resistors $R_{61}$, $R_{62}$ and $R_{64}$. According to the binary combination of the code thus applied, the division ratio of a circuit including resistors $R_{64}$, $R_{65}$, $R_{66}$ is varied as a result of which the code is converted to an analog signal or a voltage at the common connection point of the resistors $R_{60}$, $R_{61}$, and $R_{64}$ with the aid of current flowing in the resistor $R_{60}$. This voltage is amplified by an operational amplifier $OP_{30}$ the output of which is applied to a resistor $R_{67}$ as a result of which the correcting reference voltage $V_{cora}$, which has the form of a stepwise analog signal which varies successively in eight steps, is obtained. The correcting reference voltage $V_{corb}$ outputted by the counter 35a is applied to the memory device 37 at all times and the memory device 37 stores the code of the correcting reference voltage $V_{corb}$ when the write signal $S_w$ is applied thereto. In this operation, an address is specified by the address signal $S_a$ and in accordance therewith the code is stored in the address thus specified. As the address signal is also a binary coded signal, sixty-four addresses can be specified with this embodiment of the invention. The correcting reference voltage $V_{corb}$ represented by the code is obtained as a result of the comparison of the analog electrical signal $I_1$ outputted by one of the photoelectric conversion elements $1_{11}$ through $1_{m1}$ which corresponds to the address with the correcting reference voltage $V_{cora}$ as a threshold value. According to the combination of the code of the correcting reference voltage $V_{corb}$ which is read in response to the application of the read signal $S_r$ upon being addressed by the address signal $S_a$, one of the correction values $V_{cor}$ having a level from one of eight different steps is formed at the common connection point of resistors $R_{69}$, $R_{70}$, $R_{71}$ forming the D/A converter circuit 32b in the correction value addition circuit 32 and the correction value thus formed is added to the analog electrical signal $I_1$ supplied through a resistor $R_{68}$. The addition result is applied through an operational amplifier $OP_{31}$ to the comparison circuit 33.

Figure 15:
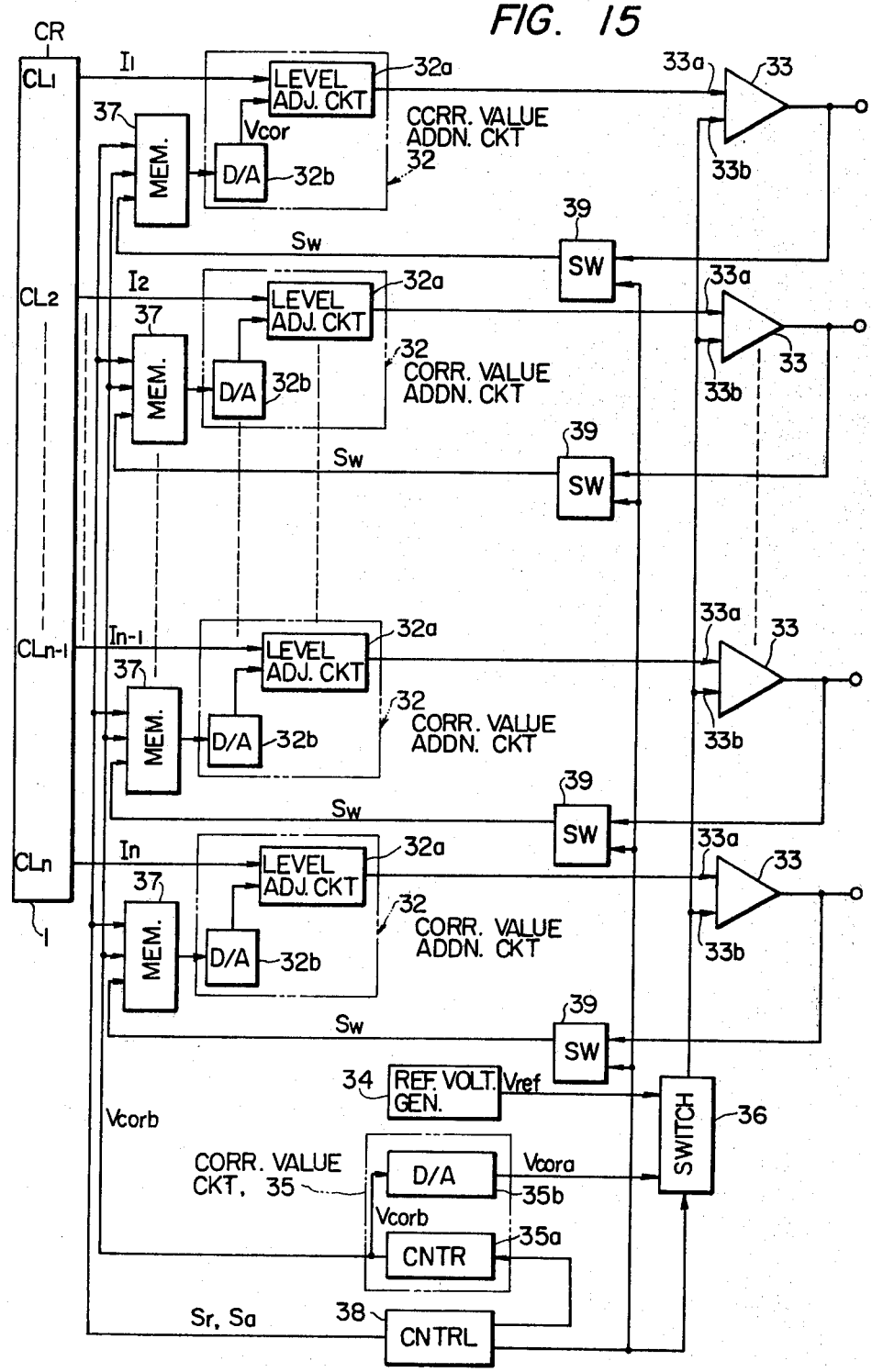
FIG. 15 is a block diagram showing a third preferred embodiment of the invention.

The circuit elements which are used for processing the other analog signals $I_2$ through $I_n$ are all similar to those required for processing the analog signal $I_1$ which have been described with reference to FIG. 13. That is, as shown in FIG. 15, identical circuit elements are provided for processing the analog signals $I_1$ through $I_n$ which are supplied from columns $CL_1$ through $CL_n$ in the photoelectric conversion device 1.

The operation of the binary coding circuit according to the invention will be described with reference to the operation of an optical character reading device employing the binary coding circuit. It is essential to correct the fluctuations in sensitivity of the photoelectric conversion elements $1_{11}$ through $1_{mn}$ in the photoelectric conversion device 1 before the optical character reading device is operated to read characters or the like. For this purpose, the control circuit 38 is operated to connect the analog switch 36 to the correction value setting signal generating circuit 35 so that the switch 39 is turned on while the application of the read signal $S_r$ is prevented. Under this condition, the photoelectric conversion device 1 is scanned over, for instance, a white sheet. If, in this case the photoelectric conversion elements $1_{11}$ through $1_{mn}$ all had equal characteristic, then the output analog electrical signals $I_1$ through $I_n$ of the photoelectric conversion device 1 would be equal in level. However, in practice, not only are the photoelectric conversion elements not uniform in characteristics but also the illumination distribution provided by the light source and the lens system irradiating the white sheet is not uniform. Accordingly, the analog electrical signals $I_1$ through $I_n$ supplied to the binary coding circuit have different levels. If the analog electrical signals were used as they are, with the reference voltage $V_{ref}$ employed as the threshold value, the analog electrical signal levels would be lower than the threshold value as a result of which the analog electrical signals would be taken as black level signals.

In order to overcome this difficulty, in this embodiment of the invention, the analog electrical signals $I_1$ through $I_n$ outputted by the photoelectric conversion device 1 are subjected to comparison in the comparison circuit 33 with the correcting reference voltage $V_{cora}$ of the correction value setting signal generating circuit 35 which varies successively stepwise as the threshold value. Thus, when the threshold value varying as described above is very close in value to the corresponding analog electrical signal $I_1$ through $I_n$, the comparison circuit 33 provides an output signal. This output signal is employed as the write signal $S_w$ for the memory device 37 and the threshold value at that instant is stored, as the correcting reference voltage $V_{corb}$ supplied by the counter $35_a$ in the appropriate address in the memory device 37. In the manner described above, the correcting reference voltage $V_{corb}$ for the photoelectric conversion elements $1_{11}$ through $1_{m1}$, $1_{12}$ through $1_{m2}$, ..., $1_{1(n-1)}$ through $1_{m(n-1)}$, and $I_{1n}$ through $1_{mn}$ are stored in the respective addresses in the memory device 37 defined by the lines and the columns.

In operation, when reading characters or the like with the optical character reading device, the control circuit 38 is operated to connect the analog switch 36 to the reference voltage generating circuit 34 so that when the switch 29 is turned off the read signal $S_r$ can be generated. In this state the optical character reading device reads characters or the like as a result of which the photoelectric conversion device 1 outputs the analog electrical signals $I_1$ through $I_n$ which are representative of the characters in the like. In this operation, in response to the application of the analog electrical signals $I_1$ through $I_n$ to the correction value addition circuits 32 corresponding to the columns, the address signals $S_a$ and the read signals $S_r$ are applied to the memory device 37 whereupon the correcting reference voltages $V_{corb}$ stored in the addresses corresponding to the photoelectric conversion elements $1_{11}$ through $1_{m1}$, $1_{12}$ through $1_{m2}$, ..., $1_{1(n-1)}$ through $1_{m(n-1)}$ and $1_{1n}$ through $1_{mn}$ which have outputted the analog electrical signals $I_1$ through $I_n$, respectively, are read out of the memory device 37. The correcting reference voltage $V_{corb}$ thus read are convertd to the correction values $V_{cor}$ and the correction values $V_{cor}$ are added to the analog electrical signals $I_1$ through $I_n$ in the correction value addition circuit 32 and the addition results are applied to the one input terminals $33a$ of the comparison circuit 33. In this operation, the reference $V_{ref}$ or the binary coded threshold value supplied by the reference voltage generating circuit 34 is applied to the other input terminal $33b$ of the comparison circuit 33. In response thereto, the comparison circuit 33 outputs binary signals corresponding precisely to the character region and the background region which are not affected by fluctuations in in characteristics of the photoelectric conversion elements $1_{11}$ through $1_{mn}$.

Next, the construction and operation of the level adjusting circuit $32a$ will be described in more detail.

Figure 16:
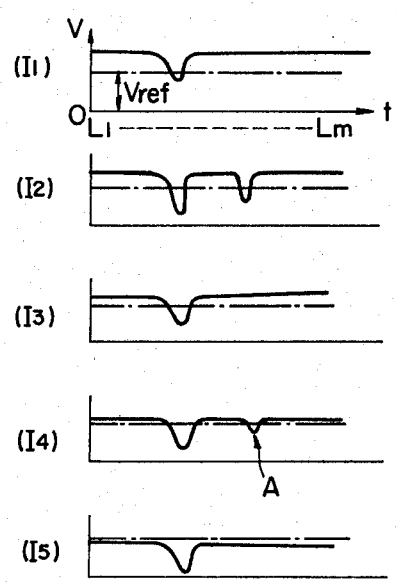
FIG. 16 is a waveform diagram showing the waveforms of analog electrical signals in the case when the light receiving surface of the photoelectric conversion device is inclined.

Waveforms $I_1$ through $I_5$ of FIG. 16 are examples of the analog electrical signals $I_1$ through $I_5$ in the case where, as shown in FIG. 1(c), the sheet 2 forms an angle $\theta_2$ with the light receiving surface $1a$ of the photoelectric conversion device 1. If, in this case, binary coding is effected with a fixed reference voltage $V_{ref}$ as indicated by the dot-chain lines in FIG. 16, the background region, which is usually white, of a part of the sheet further from the light receiving surface $1a$ of the photoelectric conversion device 1 may be detected as a character region while a noise signal such as the part A in the waveform $I_4$ of FIG. 16 may also be detected as a character region. In order to eliminate this difficulty, the level adjusting circuit $32a$ is provided.

Figure 14:
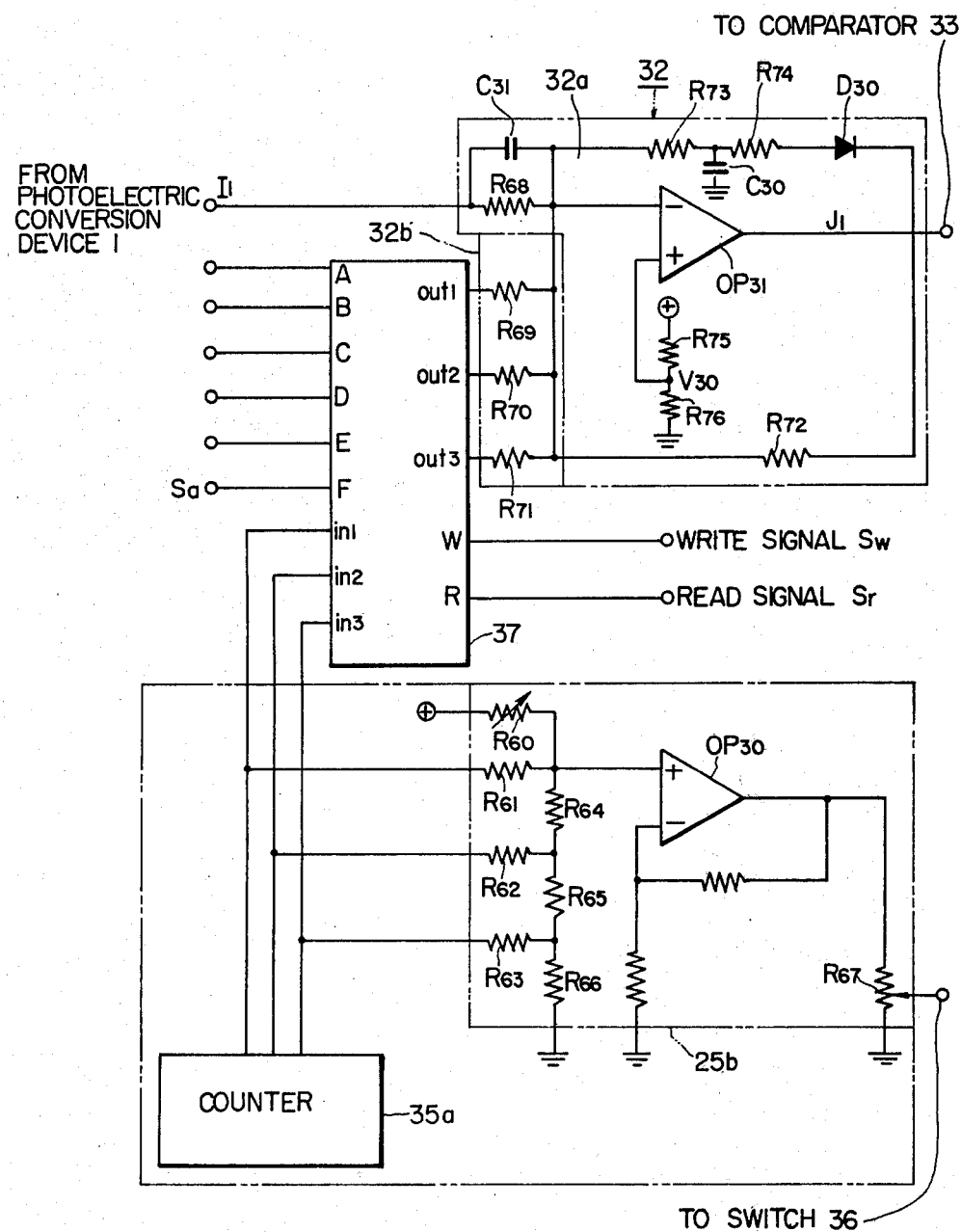
FIG. 14 is a circuit diagram, partly as a block diagram, showing portions of the circuit of FIG. 13.

The level adjusting circuit $32a$, as shown in FIG. 14, is made up of the differential amplifier $OP_{31}$, the input resistor $R_{68}$, a feedback resistor $R_{72}$, a level adjusting diode $D_{30}$, a capacitor $C_{30}$, resistors $R_{73}$ and $R_{74}$, adjustment level setting resistors $R_{75}$ and $R_{76}$, and an acceleration capacitor $C_{31}$.

The operation of the level adjusting circuit $32a$ will be described with reference to the analog electrical signal $I_1$ by way of example. The write level of an analog electrical signal $J_1$ outputted by the differential amplifier $OP_{31}$ is applied through the diode $D_{30}$ to the capacitor $C_{30}$ where it is stored. The white level thus stored is added to the analog electrical signal $I_1$ as a result of which the most white level of the analog electrical signal $J_1$ is shifted close to a set voltage $V_{30}$ which is provided by the resistors $R_{75}$ and $R_{76}$. On the other hand, a drop in the analog signal $I_1$ attributed to the presence of a character or the like is inverted and amplified by the differential amplifier $OP_{31}$ through the feedback resistor $R_{72}$ and the input resistor $R_{68}$ and is then added to the most white level which has been shifted close to the set voltage $V_{30}$. With this arrangement, the effects of inclining the light receiving surface $1a$ are effectively cancelled.

In the invention, as described with reference to the third preferred embodiment, the correction values for the fluctuations in characteristic of the photoelectric conversion elements forming the photoelectric conversion device are stored in the memory device and the correction values are added to the analog electrical signals while reading characters with the optical character reading device. Therefore, not only the fluctuations in characteristic of the photoelectric conversion elements but also the fluctuations in sensitivity including the illumination distribution characteristics of the light source and the lens system are corrected for. Furthermore, according to the invention, a level adjusting circuit is provided which effectively cancels the effects of inclining the light receiving surface of the photoelectric conversion device with respect to the sheet to be read.

What is claimed is:

1. A binary coding circuit in which analog electrical signals outputted in a parallel mode by a photoelectric conversion device having a plurality of photoelectric conversion elements arranged two-dimensionally are converted into binary signals representative of a character region and a background region comprising: a plurality of comparators; a plurality of level adjusting circuit means having inputs coupled to outputs of respective predetermined ones of said conversion elements for producing analog signals having a constant base level independent of changes in base levels of said outputs of said conversion elements, said constant base level being the same among all said level adjusting circuit means, said analog electric signals being applied to first input terminals of respective ones of said comparators; and a reference voltage generating circuit for setting a binary coding threshold voltage applied to second input terminals of said comparators having a base level determined in accordance with an extremum among base levels of said analog signals.

2. A binary coding circuit in which analog electrical signals outputted by a photoelectric conversion device having a plurality of photoelectric conversion elements arranged two-dimensionally into binary signals corresponding to background and character regions comprising:

a plurality of level adjusting circuit means having inputs coupled to outputs of respective predetermined ones of said conversion elements for producing analog signals having a constant base level independent of changes in base levels of said outputs of said conversion elements, said constant base level being the same among all said level adjusting circuit means;

a maximum level detecting circuit for detecting a maximum level among said analog signals produced by said plurality of level adjusting circuit means;

a minimum level detecting circuit for detecting a minimum level among said analog signals produced by said plurality of level adjusting circuit means;

a reference voltage generating circuit for setting a binary coding threshold value in response to maximum and minimum levels among said analog signals detected by said plurality of level adjusting circuit means; and a plurality of comparison circuits for comparing a reference voltage outputted by said reference voltage generating circuit and respective ones of said analog signals produced by said level adjusting circuit means to thereby provide output binary signals.

3. A binary coding circuit for converting analog electrical signals outputted by a photoelectric conversion device having photoelectric conversion elements arranged in matrix form into binary signals representative of a background region and a character region comprising:

a correction value setting signal generating circuit for generating a successively varying correcting reference voltage;

a comparison circuit having a first input terminal to which said analog electrical signals are applied and a second input terminal to which said correcting reference voltage is applied;

a memory device receiving an output of said comparison circuit as a write signal, said memory device storing said correcting reference voltage available at the time of a write instruction indicated by said write signal; and a correction value addition circuit for successively adding correction values of said analog electrical signals in response to said correcting reference voltage read out of said memory device.

4. A binary coding circuit for converting analog electrical signals outputted by a photoelectric conversion device having photoelectric conversion elements arranged in matrix form into binary signals representative of a background region and a character region comprising:

level adjusting circuit means having an input coupled to an output of a respective one of said photoelectric conversion elements for producing an analog signal having a constant base level independent of a base level of said output of said respective one of said photoelectric conversion elements;

a correction value setting signal generating circuit for generating a successively varying correcting reference voltage;

a comparison circuit having a first input terminal to which said analog signal produced by said level adjusting circuit is applied and a second input terminal to which said correcting reference voltage is applied;

a memory device receiving an output of said comparison circuit as a write signal, said memory device storing said correcting reference voltage available at the time of a write instruction indicated by said write signal; and a correction value addition circuit for successively adding correction values to said analog electrical signals in response to said correcting reference voltages read out of said memory device.

5. The coding circuit of either of claims 1 and 2 wherein each said level adjusting circuit means comprises:

an operational amplifier having inverting and non-inverting inputs;

a first feedback resistor coupled between an output and said inverting input of said operational amplifier;

a second resistor having a first terminal coupled to said inverting input;

a first capacitor having a first terminal coupled to a second terminal of said second resistor and a second terminal coupled to ground;

a third resistor having a first terminal coupled to said first terminal of said first capacitor;

a diode having a cathode terminal coupled to said output of said operational amplifier and an anode terminal coupled to a second terminal of said third resistor;

a second capacitor and a fourth resistor having first terminals coupled to said inverting input terminal of said operational amplifier and second terminals coupled to receive an output of said photoelectric conversion device;

fifth and sixth resistors coupled in series with one another between a voltage source and ground, the common connection point of said fifth and sixth resistors being coupled to said non-inverting input terminal of said operational amplifier.

6. The coding circuit of claim 5 wherein said reference voltage generating circuit comprises a plurality of diodes, one of said diodes being provided for each of said level adjusting circuits and each of said diodes having a first terminal coupled to said level among said analog signals produced by said plurality of level adjusting circuit means;

a black level detecting circuit having inputs coupled to receive said analog signals produced by said plurality of level adjusting circuit means for detecting a level representing a peak black level among said analog signals produced by said plurality of level adjusting signal means;

a reference voltage generator operating in response to output signals of said white level detecting circuit representing the peak white level and said black level detecting circuit representing the peak black level to provide a reference voltage; and a plurality of comparison circuits, one of said comparison circuits being provided for each of said level adjusting circuit means, each of said comparison circuits having one input coupled to the output of a corresponding one of said level adjusting circuit means and a second input coupled to a reference voltage output of said reference voltage generator.

7. The binary coding circuit of claim 6 wherein said voltage reference generator comprises:

a comparison circuit;

a resistor having a first terminal coupled to one input of said comparison circuit and a second terminal coupled to said second terminals of said diodes and a resistor coupled between a voltage source and said second terminals of said diodes; and a variable capacitor coupled between a second input of said comparison circuit and ground.

8. A binary coding circuit for converting analog electrical signals outputted by a photoelectric conversion device having photoelectric conversion elements arranged in lines and columns into binary signals corresponding to background and character regions comprising:

a plurality of level adjusting circuits, one of said level adjusting circuits being provided for each element in a selected one of said lines and columns, an input of each of said level adjusting circuits being coupled to receive an output from a corresponding element of said selected one of said lines and columns;

a white level detecting circuit having inputs coupled to outputs of said level adjusting circuits for detecting the peak white level represented by said output signals from said level adjusting circuits;

a black level detecting circuit for detecting the peak black level represented by said output signals of said level adjusting circuits;

a reference voltage generator operating in response to output signals of said white level detecting circuit representing the peak white level and said black level detecting circuit representing the peak black level to provide a reference voltage; and a plurality of comparison circuits, one of said comparison circuits being provided for each of said level adjusting circuits, each of said level adjusting circuits having one input coupled to the output of a corresponding one of said level adjusting circuits and a second input coupled to a reference voltage output of said reference voltage generator.

9. The binary coding circuit of claim 8 wherein each of said level adjusting circuits comprises:

an operational amplifier having inverting and non-inverting inputs;

a first feedback resistor coupled between an output and said inverting input of said operational amplifiers;

a second resistor having a first terminal coupled to said inverting input;

a first capacitor having a first terminal coupled to a second terminal of said second resistor and a second terminal coupled to ground;

a third resistor having a first terminal coupled to said first terminal of said first capacitor;

a diode having a cathode terminal coupled to said output of said operational amplifier and an anode terminal coupled to a second terminal of said third resistors;

a second capacitor and a fourth resistor having first terminals coupled to said inverting input terminal of said operational amplifier and second terminals coupled to receive an output of said photoelectric conversion device;

fifth and sixth resistors coupled in series with one another between a voltage source and ground, the common connection point of said fifth and sixth resistors being coupled to said non-inverting input terminal of said operational amplifier.

10. The binary coding circuit of claim 8 wherein said white level detecting circuit comprises:

a first plurality of diodes, each of said diodes having a cathode terminal coupled to an output of a corresponding level adjusting circuit and having anode terminals coupled in common;

a differential amplifier, said commonly connected anode terminals of said first plurality of diodes being coupled to an inverting input terminal of said differential amplifier;

a first capacitor and first resistor coupled in parallel with one another between a voltage source and an output of said differential amplifier, the time constant of the combination of said capacitor and resistor being determined in accordance with a white level variation percentage for a maximum angle of inclination between a sheet and said photoelectric conversion device;

a second differential amplifier having a non-inverting input coupled to said first resistor and first capacitor and said output of said first differential amplifier;

an electronic switch having one terminal coupled to said first capacitor, said first resistor and said output of said first differential amplifier, a second terminal coupled to an adjustable voltage source and a switching control input coupled to receive a synchronizing pulse signal, said synchronizing signal being in synchronization with the scanning of said photoelectric conversion device.

11. The coding circuit of claim 8 wherein said black level detecting circuit comprises:

a plurality of diodes having anode terminals coupled to corresponding outputs of said level adjusting circuits and having commonly connected cathode terminals;

a first differential amplifier;

a first capacitor coupled between said commonly connected cathode terminal of said plurality of diodes and a non-inverting input terminal of said first differential amplifier;

an electronic switch having one terminal coupled to said non-inverting input terminal of said first differential amplifier, a second terminal coupled to ground and a switching control input terminal coupled to a source of a gate signal;

a first resistor and first capacitor having first terminals thereof coupled to an output of said first differential amplifier and second terminals coupled to ground;

a second differential amplifier having a non-inverting input terminal coupled to said second terminals of said capacitor and resistor and said output of said first differential amplifier; and means for applying a fixed reference voltage to an inverting input of said second differential amplifier.

12. The coding circuit of claim 11 wherein the time constant of said capacitor and resistor is set to maintain a charge voltage thereon for a period of time required to scan a single frame of said photoelectric conversion device.

13. The coding circuit of claim 8 wherein said reference voltage generator comprises:
a differential amplifier;
a first resistor coupling an output of said white level detecting circuit to an inverting input of said differential circuit;
a second resistor coupling an output of said black level detecting circuit to a non-inverting input of said differential amplifier; and
a variable source of voltage applied to said non-inverting input of said differential amplifier.

14. A binary coding circuit for converting analog electrical signals outputted by a photoelectric conversion device having photoelectric conversion elements arranged in lines and columns into binary signals corresponding to background and character regions comprising:
a plurality of correction value addition circuits, each of said correction value addition circuits receiving on an input thereof an output from a corresponding one of said photoelectric conversion elements;
a plurality of comparison circuits, one of said comparison circuits being provided for each of said correction value addition circuits, each of said comparison circuits having one input coupled to an output of the corresponding correction value addition circuit;
a correction value circuit including a first digital-to-analog converter and a binary counter, the count output of said counter being coupled to digital inputs of said digital-to-analog converter;
a plurality of memory means, one of said memory means being provided for each of said correction value addition circuits, each of said memory means including means for selecting between first and second digital inputs thereto, digital outputs of said counter of said correction value circuit being coupled to a first of said digital inputs of said memory means;
a plurality of digital switch means, one of said digital switch means being provided for each of said correction value addition circuits, each of said digital switch means receiving an input from an output of a corresponding comparison circuit and having an output coupled to one of said digital inputs of said memory means, each of said switch means having a control input thereto coupled in common to a first control signal output of a control circuit;
a reference voltage generator; and
analog switch means having a first signal input coupled to an output of said reference voltage generator, a second signal input coupled to an output of said first digital-to-analog converter, a control signal input coupled to receive said first control signal and an output coupled to a second input of each of said comparison circuits.

15. The coding circuit of claim 14 wherein said correction value addition circuit comprises a second digital-to-analog converter; an operational amplifier having an inverting input coupled to an output of said second digital-to-analog converter and a non-inverting input coupled to a fixed voltage source; and a feedback network between said inverting input and an output of said operational amplifier including a first resistor having a first terminal coupled to said inverting input of said operational amplifier, a first capacitor having a first terminal coupled to said first terminal of said first resistor and a second terminal coupled to a second terminal of said first resistor, a second resistor having a first terminal coupled to said first terminal of said first resistor, a second capacitor having a first terminal coupled to a second terminal of said second resistor and a second terminal coupled to ground, a third resistor having a first terminal coupled to said first terminal of said second capacitor, and a diode having an anode terminal coupled to a second terminal of said third resistor and a cathode terminal coupled to an output of said operational amplifier, said output of said operational amplifier forming the output of said correction value addition circuit.

* * * * *